US010768279B2

(12) United States Patent
Jungmaier et al.

(10) Patent No.: US 10,768,279 B2
(45) Date of Patent: Sep. 8, 2020

(54) ELECTRONIC DEVICE FOR GESTURE RECOGNITION WITH IMPROVED DATA PROCESSING

(71) Applicant: Infineon Technologies AG, Neubiberg (DE)

(72) Inventors: Reinhard Wolfgang Jungmaier, Aying (DE); Saverio Trotta, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 245 days.

(21) Appl. No.: 15/600,524

(22) Filed: May 19, 2017

(65) Prior Publication Data

US 2017/0336497 A1 Nov. 23, 2017

(30) Foreign Application Priority Data

May 20, 2016 (DE) .................. 10 2016 109 342

(51) Int. Cl.
| | | |
|---|---|---|
| *G01S 7/41* | (2006.01) | |
| *G01S 7/35* | (2006.01) | |
| *G01S 13/88* | (2006.01) | |
| *G01S 13/34* | (2006.01) | |
| *G06F 3/01* | (2006.01) | |

(52) U.S. Cl.
CPC .............. *G01S 7/415* (2013.01); *G01S 7/35* (2013.01); *G01S 13/343* (2013.01); *G01S 13/88* (2013.01); *G06F 3/011* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,335,701 | B1* | 1/2002 | Fujisaka | ............... G01S 7/288 342/115 |
| 8,264,401 | B1* | 9/2012 | Kavaler | ............... G01S 7/003 342/128 |
| 10,120,594 | B1* | 11/2018 | Hardt | ............... G06F 3/0689 |
| 2002/0114493 | A1* | 8/2002 | McNitt | ............... A61B 5/1124 382/107 |
| 2007/0021203 | A1* | 1/2007 | Edwards | ............... A63F 13/10 463/30 |

(Continued)

FOREIGN PATENT DOCUMENTS

| | | |
|---|---|---|
| CN | 103793059 A | 5/2014 |
| CN | 104798062 A | 7/2015 |

(Continued)

OTHER PUBLICATIONS

Wan, Qian, et al., Gesture Recognition for Smart Home Applications using Portable Radar Sensors, IEEE, Engineering in Medicine and Biology, Aug. 2014 (Year: 2014).*

*Primary Examiner* — Marcus E Windrich
(74) *Attorney, Agent, or Firm* — Slater Matsil, LLP

(57) ABSTRACT

An electronic device for gesture recognition comprises at least one transmission antenna port, at least reception antenna port, an analog-to-digital converter connected to the at least one reception antenna port, and first and second buffer memories connected to the analog-to-digital converter. The first and second buffer memories are configured to store data received from the analog-to-digital converter and configured to output the stored data in an alternating manner.

12 Claims, 5 Drawing Sheets

(56) References Cited

U.S. PATENT DOCUMENTS

| | | | |
|---|---|---|---|
| 2009/0054075 A1* | 2/2009 | Boejer | G01S 19/09 455/456.1 |
| 2012/0088544 A1* | 4/2012 | Bentley | A63F 13/428 455/556.1 |
| 2013/0190903 A1* | 7/2013 | Balakrishnan | A61B 5/0077 700/91 |
| 2014/0046922 A1* | 2/2014 | Crook | G06F 16/3326 707/706 |
| 2014/0143470 A1* | 5/2014 | Dobbs | G06F 15/76 710/308 |
| 2014/0298672 A1* | 10/2014 | Straker | H04W 12/06 34/175 |
| 2015/0146920 A1 | 5/2015 | Mazurenko et al. | |
| 2015/0346820 A1 | 12/2015 | Poupyrev et al. | |
| 2017/0074974 A1* | 3/2017 | Rao | G01S 7/352 |

FOREIGN PATENT DOCUMENTS

| | | |
|---|---|---|
| CN | 105278674 A | 1/2016 |
| EP | 2953007 A1 | 12/2015 |
| WO | 2007120995 A1 | 10/2007 |
| WO | 2016022770 A1 | 2/2016 |

* cited by examiner

ELECTRONIC DEVICE FOR GESTURE RECOGNITION WITH IMPROVED DATA PROCESSING

This application claims priority to German patent application No. 102016109342.4, filed on May 20, 2016, which application is hereby incorporated herein by reference in its entirety.

TECHNICAL FIELD

The present disclosure relates in general to an electronic device for gesture recognition, to an electronic device, and to a method for processing electronic data, and in particular to an electronic device for gesture recognition with improved data processing, and a method for processing electronic data with improved processing performance.

BACKGROUND

In recent years intelligent driver assistance systems have attracted increasing attention in the automotive industry. One of such systems can be a user interface that tracks and recognizes a driver's hand gestures. A gesture-based user interface can improve the driver's safety in automobiles. It allows drivers to focus on driving while interacting with the various control systems in the car like, for examples, air-conditioning.

For implementing a short-range radar sensor for hand gesture sensing, it was further found that Frequency Modulated Continuous Wave (FMCW) radar with multiple receivers is very well suited. In this system, the transmitted signal is frequency-modulated by a periodic saw-wave function. The transmitted wave is reflected at a moving object like a moving hand and the received reflected wave is subject to a frequency shift (Doppler shift) and is also subject to a time delay. The relative motion of the object with respect to the radar causes the Doppler shift and the signal travelling to and from the object causes the time delay. The transmitted signal and the received signal are then mixed to produce a beat-signal which can be evaluated to yield the distance of the moving object.

An FMCW radar system may comprise several devices such as, for example, a radio frequency (RF) front-end device, a baseband device, an analog-to-digital converter (ADC) device, a micro-controller (MCU) device, and an application processor (AP) device. After converting the received analog signals by the analog-to-digital converter to digital data, a very high number of digital data have to be processed and shifted to a signal processing and detection device. The number of digital data to be processed and shifted depends mostly on the number of reception antennas of the radar system.

SUMMARY

In accordance with a first aspect of the disclosure, an electronic device for gesture recognition comprises at least one transmission antenna port, an analog-to-digital converter connected to the at least one reception antenna port, and first and second buffer memories connected to the analog-to-digital converter and configured to store data received from the analog-to-digital converter and to output the stored data in an alternating manner.

In accordance with a second aspect of the disclosure, a radar sensor system comprises a sensor device and an application processor connected to the sensor device, the sensor device comprising an analog-to-digital converter, first and second buffer memories connected to the analog-to-digital converter and configured to store data received from the analog-to-digital converter and to output the stored data in an alternating manner.

In accordance with a third aspect of the disclosure, an electronic device comprises an analog-to-digital converter, and first and second buffer memories connected to the analog-to-digital converter and configured to store data received from the analog-to-digital converter and to output the stored data in an alternating manner.

In accordance with a forth aspect of the disclosure, a method for processing electronic data comprises receiving analog data by at least one reception antenna, converting the analog data to digital data, storing the digital data in first and second buffer memories, and outputting the stored digital data out of the first and second buffer memories in an alternating manner.

The person skilled in the art recognizes additional features and advantages upon reading the following detailed description and upon giving consideration to the accompanying drawings.

BRIEF DESCRIPTION OF THE DRAWINGS

The accompanying drawings are included to provide a further understanding of examples and are incorporated in and constitute a part of this specification. The drawings illustrate examples and together with the description serve to explain principles of examples. Other examples and many of the intended advantages of examples will be readily appreciated as they become better understood by reference to the following detailed description.

The elements of the drawings are not necessarily to scale relative to each other. Like reference numerals designate corresponding similar parts.

DETAILED DESCRIPTION OF ILLUSTRATIVE EMBODIMENTS

Figure 1:
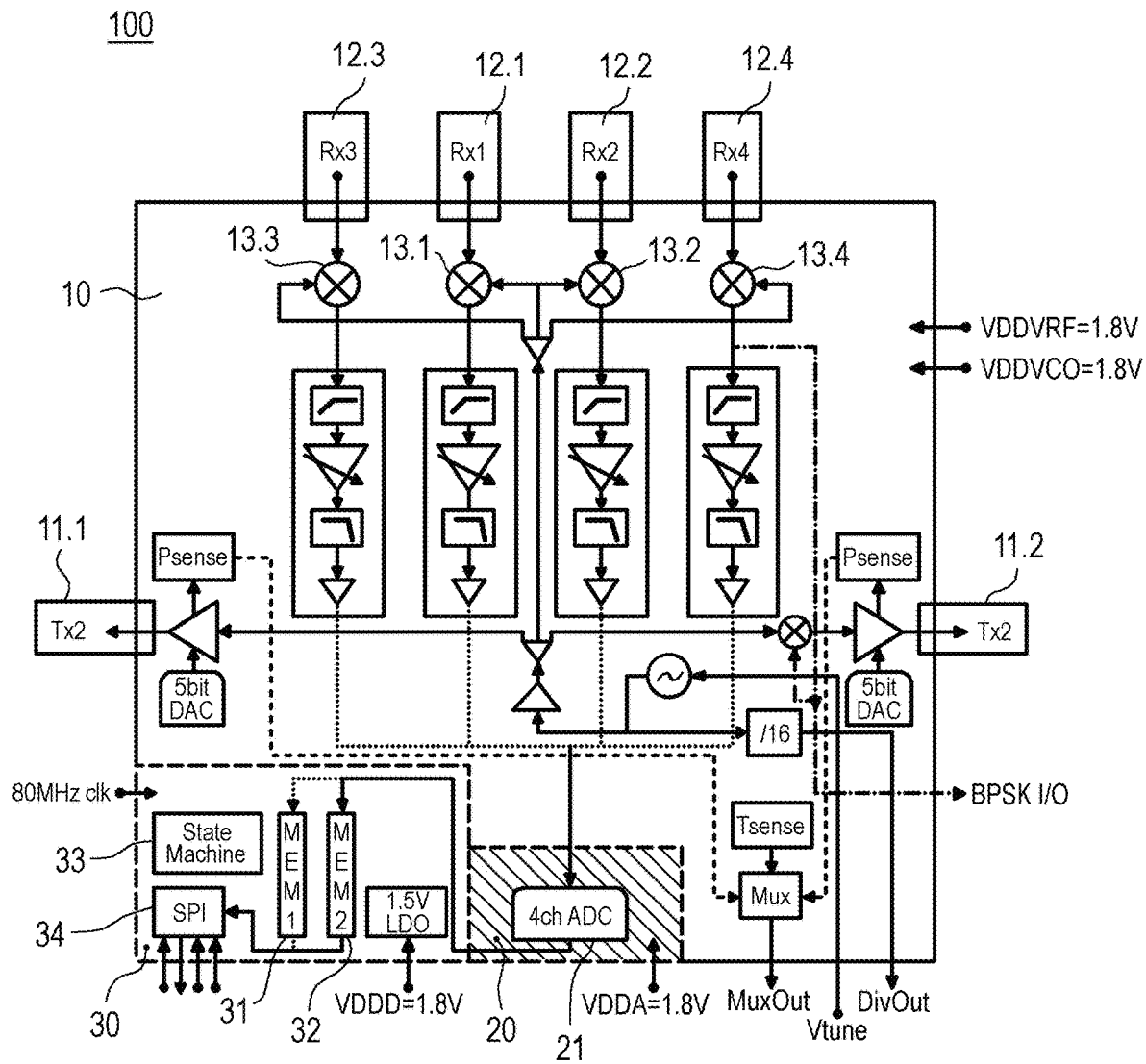
FIG. 1 shows a schematic block diagram of an example of an electronic device for gesture recognition.

The aspects and examples are now described with reference to the drawings, wherein like reference numerals are generally utilized to refer to like elements throughout. In the following description, for purposes of explanation, numerous specific details are set forth in order to provide a thorough understanding of one or more aspects of the examples. It may be evident, however, to one skilled in the art that one or more aspects of the examples may be practiced with a lesser degree of the specific details. In other instances, known structures and elements are shown in schematic form in order to facilitate describing one or more aspects of the examples. It is to be understood that other examples may be utilized and structural or logical changes may be made without departing from the scope of the present disclosure. It should be noted further that the drawings are not to scale or not necessarily to scale.

In the following detailed description, reference is made to the accompanying drawings, which form a part hereof, and in which is shown by way of illustration specific aspects in which the disclosure may be practiced. In this regard, directional terminology, such as "top", "bottom", "front", "back" etc., may be used with reference to the orientation of the figures being described. Since components of described devices may be positioned in a number of different orientations, the directional terminology may be used for purposes of illustration and is in no way limiting. It is understood that other aspects may be utilized and structural or logical changes may be made without departing from the scope of the present disclosure. The following detailed description, therefore, is not to be taken in a limiting sense, and the scope of the present disclosure is defined by the appended claims.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present disclosure is defined by the appended claims.

Insofar as a method for processing electronic data is described as having a specific order of method steps, it should be mentioned that any other appropriate order of the method steps may be employed by the skilled person. It should further be mentioned that any particular method features or method steps mentioned in connection with a method are to be understood as also disclosing a device, apparatus, or system being capable of performing such method feature or method steps, even if such a device, apparatus, or system is not explicitly described or illustrated in the figures. Furthermore any features, remarks, or comments, mentioned in connection with a device, apparatus, or system are to be understood as also disclosing a method feature or method step designating the particular function of the respective device feature.

FIG. 1 shows a schematic block diagram of an example of an electronic device for gesture recognition according to the first aspect. The electronic device 100 comprises a first transmission antenna port 11.1 and a second transmission antenna port 11.2, and a first reception antenna port 12.1, a second reception antenna port 12.2, a third reception antenna port 12.3, and a fourth reception antenna port 12.4. The electronic device 100 further comprises an analog-to-digital converter 21, a first buffer memory 31, and a second buffer memory 32, both of them connected to the analog-to-digital converter 21 and configured to store data received from the analog-to-digital converter 21 and to output the stored data in an alternating manner.

According to an example of the electronic device 100 of the first aspect, the electronic device 100 is configured as a single chip and the aforementioned electronic components are integrated on the single chip.

According to an example of the electronic device 100 of the first aspect, the electronic device 100 comprises at least one transmission antenna port and at least one reception antenna port. According to a further example thereof, the electronic device 100 comprises two transmission antenna ports and four reception antenna ports, as shown in the example of FIG. 1.

According to an example of the electronic device 100 of the first aspect, the electronic device 100 is configured to adopt a first state and a second state in an alternating manner, wherein in the first state the first buffer memory 31 outputs the data stored in the first buffer memory 31, and in the second state the second buffer memory 32 outputs the data stored in the second buffer memory 32. According to a further example thereof, in the first state the second buffer memory 32 stores data received from the analog-to-digital converter 21, and in the second state the first buffer memory 31 stores data received from the analog-to-digital converter 21.

According to an example of the electronic device 100 of the first aspect, the electronic device 100 further comprises a state machine 33 configured to adopt the first and second states in an alternating manner. According to a further example thereof, in the first state the state machine 33 enables the first buffer memory 31 to output the data stored in the first buffer memory 31, and in the second state the state machine 33 enables the second buffer memory 32 to output the data stored in the second buffer memory 32. According to a further example thereof, in the first state the state machine 33 enables the second buffer memory 32 to store data received from the analog-to-digital converter 21, and in the second state the state machine 33 enables the first buffer memory 31 to store data received from the analog-to-digital converter 21. A more detailed example thereof will be shown and explained later in connection with FIG. 2.

According to an example of the electronic device according to the first aspect, the electronic device 100 may comprise or be divided into three subsections, namely a first front-end subsection 10, a second ADC subsection 20, and a third memory subsection 30. The first subsection 10 mainly comprises the transmission antenna ports 11.1 and 11.2, and the reception antenna ports 12.1-12.4, and further electronic components like mixers, filters and amplifiers the functions of which will not be explained in further detail here. Basically the signals received by the reception antennas are down converted by mixers 13.1 to 13.4 to intermediate frequency signals and thereafter these intermediate frequency signals are filtered and amplified. In the example as shown in FIG. 1 the second ADC subsection 20 mainly comprises a 4-channel ADC 21 that comprises an input for inputting the analog signals received from the four reception channels, and an output connected to the third memory section 30. The third memory section 30 mainly comprises the first and second buffer memories 31 and 32 and the state machine 33. The third memory section 30 may further comprise an output interface 34 that may be configured in the form of a serial peripheral interface (SPI) communication module.

Figure 2:
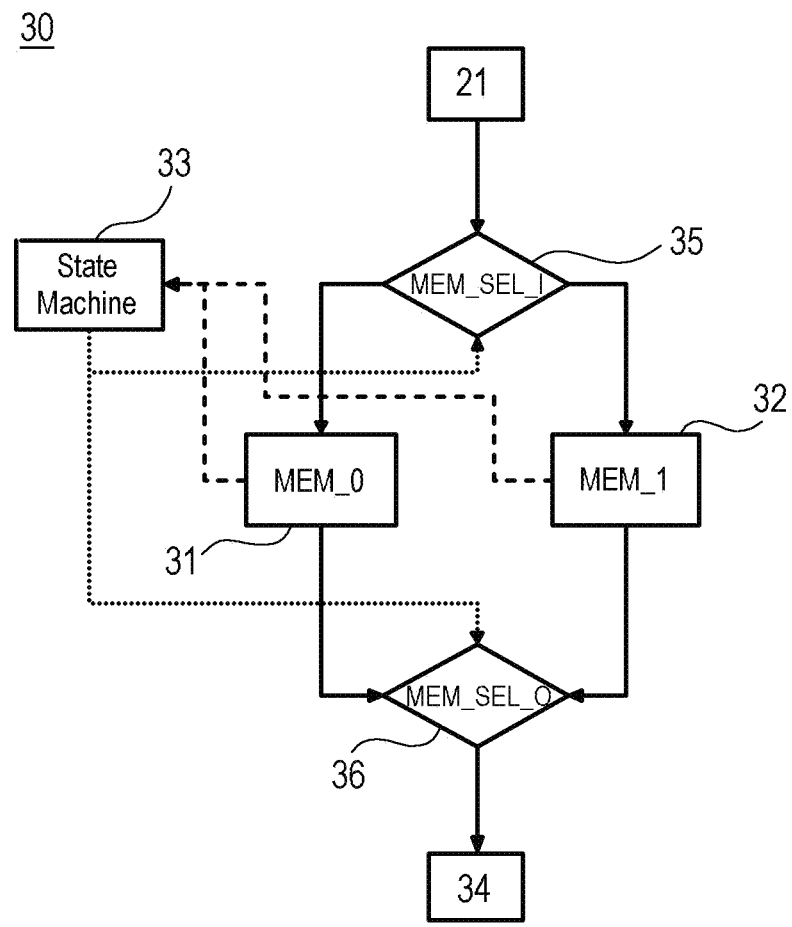
FIG. 2 shows a schematic block diagram of an example of a memory section of the electronic device for gesture recognition.

FIG. 2 shows a schematic block diagram of essential parts of the third memory section 30 of FIG. 1.

According to an example of the electronic device 100 according to the first aspect, the electronic device 100 further comprises a first switch 35 comprising a first input, a first output, and a second output, wherein the first input is connected to an output of the analog-to-digital converter 21, the first output is connected to an input of the first buffer memory 31, and the second output is connected to an input of the second buffer memory 32, and wherein the first switch 35 is configured to transmit data received from the analog-to-digital converter 21 to the first and second buffer memories 31 and 32 in an alternating manner. According to a further example thereof, the electronic device 100 further comprises a second switch 36 comprising a first input, a second input, and an output, wherein the first input is connected to an output of the first buffer memory 31, and the second input is connected to an output of the second buffer memory 32, and wherein the second switch 36 is configured to transmit data received from the first and second buffer memories 31 and 32 to the output in an alternating manner.

According to an example of the electronic device 100 according to the first aspect, as shown in FIG. 2 the first switch 35 comprises a second input connected to an output of the state machine 33.

According to an example of the electronic device 100 according to the first aspect, as shown in FIG. 2 the second switch 36 comprises a third input connected to an output of the state machine.

According to the example of the electronic device 100 according to the first aspect, as shown in FIG. 2 the state machine 33 can be configured such that it comprises a single output that is connected to either one of the second input of the first switch 35 and the third input of the second switch 36.

According to the example as shown in FIG. 2 according to the first aspect, each one of the first buffer memory 31 and the second buffer memory 32 comprises an output connected to an input of the state machine 33, wherein each one of first buffer memory 31 and the second buffer memory 32 can be configured to supply a signal to the state machine 33 indicating that a storing operation of storing digital data received from the analog-to-digital converter 31 has been completed. According to a further example thereof, as shown in FIG. 2, the state machine 33 comprises a single input connected to either one of the output of the first buffer memory 31 and the output of the second buffer memory 32.

More specifically, the double buffered concept with the first and second buffer memories 31 and 32 enables streaming out and storing out the sample data in parallel. During the sampling operation the busy memory is not available for streaming out the data, and during the streaming out operation the sampling memory is not available for sinking the sample data. The two buffer memories 31 and 32 can be used together with the first and second switches 35 and 36, wherein the first switch 35 hands over the sampling memories either to the ADC or the output. The second switch 36 is connected to the first buffer memory 31 as well as to the second buffer memory 32, wherein both first and second switches 35 and 36 are controlled by the state machine 33. When the ADC has completed to filling in the first buffer memory 31, the first buffer memory 31 sends a flag to the state machine 33 that knows that at the next cycle the first buffer memory 31 should be set to the output while the ADC should fill-in the second buffer memory 32, and so on.

The following table shows the different states that can be taken on by the electronic device 100, where SPI refers to the output interface module 34.

| MEMSEL | ADC WRITES TO | SPI READS FROM |
|---|---|---|
| 0 | MEM0 | MEM1 |
| 1 | MEM1 | MEM0 |

According to an example of the electronic device 100 of the first aspect, the first and second buffer memories 31 and 32 are similar or equal in one or more of structure and memory capacity.

According to an example of the electronic device 100 of the first aspect, one or more of the first and second buffer memories 31 and 32 have a memory capacity in a range from 1 kB to 100 kB, more specifically from 1 kB to 50 kB, and more specifically 1 kB to 10 kB in some embodiments.

According to an example of the electronic device 100 of the first aspect, one or more of the first and second first and second buffer memories 31 and 32 are configured as SRAM memories.

According to an example of the electronic device 100 of the first aspect, the electronic device 100 further comprises an output interface 34 connected to the first and second buffer memories 31 and 32. According to a further example thereof, the output interface 34 is connected to an output of the second switch 36.

According to an example of the electronic device 100 of the first aspect, the output interface 34 is configured in the form of a serial peripheral interface (SPI) communication module.

Further examples of the electronic device of the first aspect can be formed by incorporating examples or features which will be described in the following in connection with the further aspects and examples of the disclosure.

Figure 3:
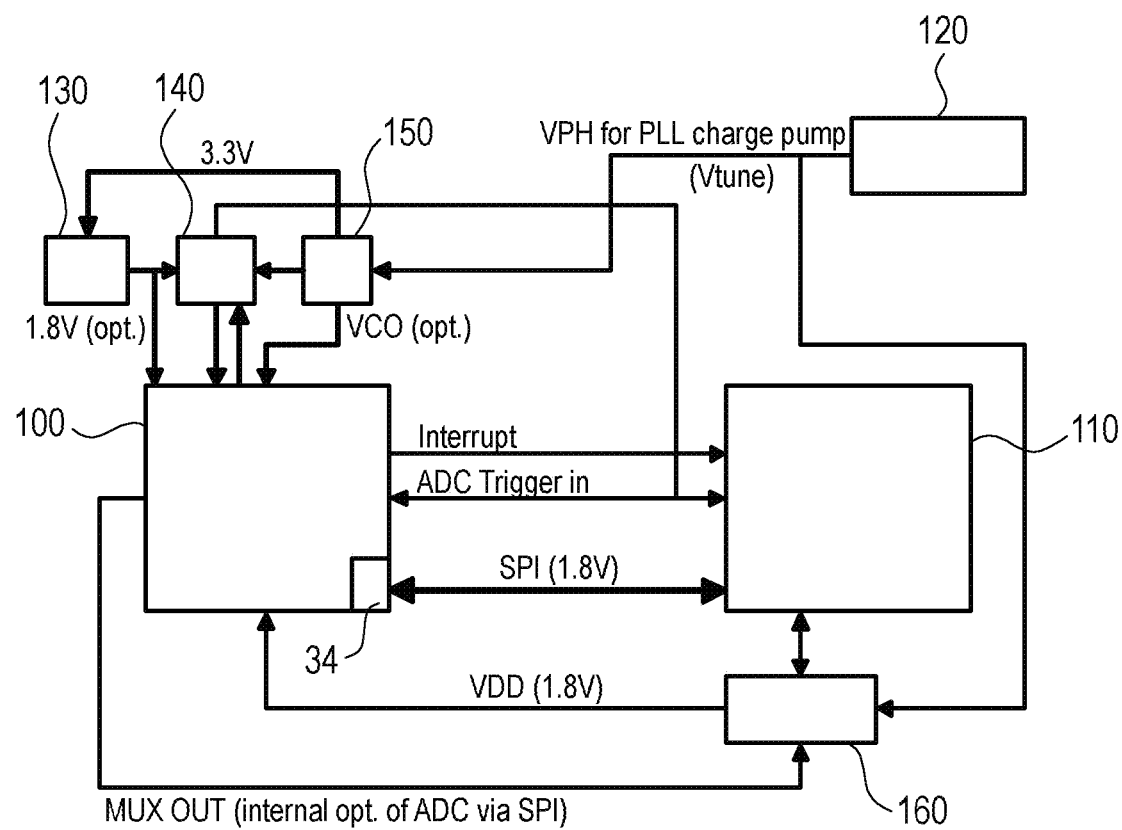
FIG. 3 shows a schematic block diagram of an example of a radar system for gesture recognition.

FIG. 3 shows a schematic block diagram of an example of a radar sensor system according to the second aspect. The radar sensor system 200 as shown in FIG. 3 may be configured in the form of, for example, an FMCW radar sensor system. The radar sensor system 200 of FIG. 3 comprises a sensor device 100 and an application processor 110 connected to the sensor device 100, wherein the sensor device 100 may correspond to the electronic device 100 as shown and explained above in connection with FIG. 1, insofar as the sensor device 100 comprises an analog-to-digital converter, first and second buffer memories connected to the analog-to-digital converter and configured to store data received from the analog-to-digital converter and to output the stored data in an alternating manner.

The radar sensor system 200 of FIG. 3 may further comprise a battery 120, an oscillator 130, a phase-locked loop circuit (PLL) 140, a voltage-controlled oscillator (VCO) 150, and a power management unit 160. The output of the battery 120 is connected to respective inputs of the VCO 150 and the power management unit 160. The power management unit 160 supplies a VDD voltage of 1.8 V to the sensor device 100. An output of the oscillator 130 is connected to an input of the PLL 140, an output of the VCO 150 is connected to an input of the PLL 140, and an output of the PLL 140 is connected to an input of the sensor device 100. An output of the VCO 150 is connected to an input of the oscillator 130, and an output of the VCO 150 is connected to an input of the sensor device 100.

One important challenge of the radar sensor system 200 is to provide digital representations of intermediate frequency signals (IF samples) to the application processor 110. Therefore, the sensor device 100 should be capable of transferring the IF samples of, for example, up to 4 receiver channels, as shown in FIG. 1, with a sampling resolution of e.g. 12 bits per sample at a high sampling rate of some millions samples per second, e.g. 2.5 Msps. The application processor 110 incorporates the calculation power to identify the data sent by the sensor device 100 and comprises some communication interfaces to the outside world. The communication interface between the sensor device 100 and the application processor 110 is, for example, the serial peripheral interface (SPI) communication module 34. The SPI communication module 34 defines and limits the amount of data to be transferred.

Further examples of the radar sensor system of the second aspect can be formed by adding anyone of the examples or features as were described above in connection with an electronic device for gesture recognition of the first aspect.

The present disclosure also relates to an electronic device according to a third aspect. The electronic device according to the third aspect comprises an analog-to-digital converter, and first and second buffer memories are connected to the analog-to-digital converter and configured to store data received from the analog-to-digital converter and to output the stored data in an alternating manner.

According to an example of the electronic device of the third aspect, the electronic device further comprises a plurality of signal channels, where each one of the signal channels is connected to the analog-to-digital converter.

According to an example of the electronic device of the third aspect, the electronic device further comprises a first switch connected to inputs of the first and second buffer memories, and a second switch connected to outputs of the first and second memories.

According to an example of the electronic device of the third aspect, the electronic device further comprises an output interface, in particular a serial peripheral interface (SPI) communication module, connected to an output of the second switch.

According to an example of the electronic device of the third aspect, the electronic device further comprises a state machine connected to the first and second switches.

Further examples of the electronic device of the third aspect can be formed by adding any one of the examples or features as described above in connection with an electronic device for gesture recognition of the first aspect.

Figure 4:
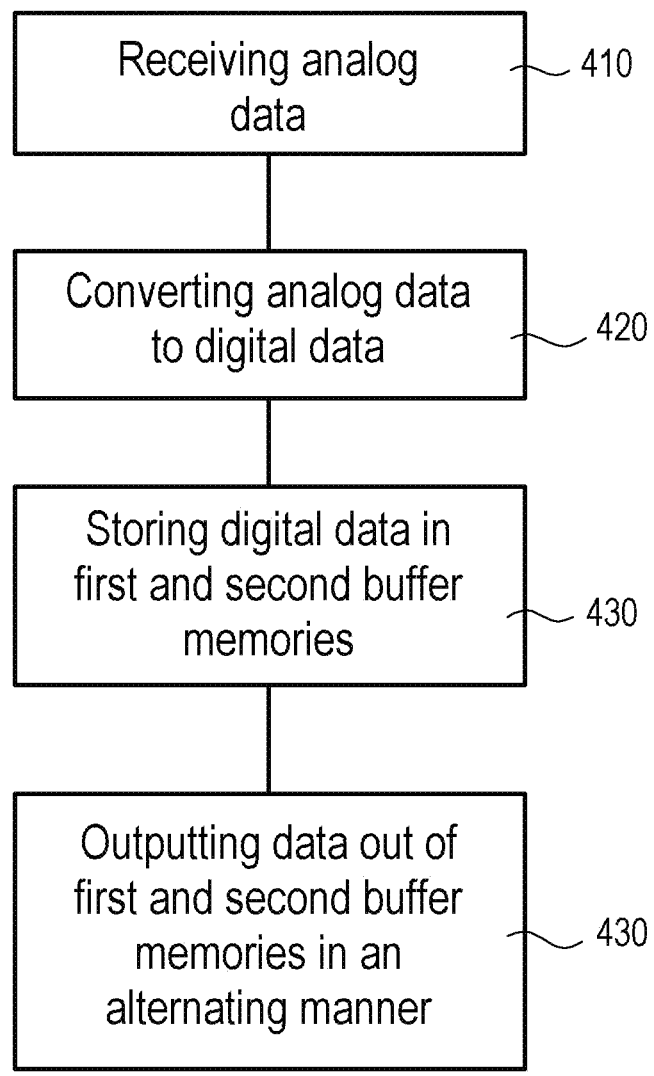
FIG. 4 shows a flow diagram of an example of a method for processing electronic data.

FIG. 4 shows a flow diagram that illustrates an example of a method for processing electronic data according to a forth aspect. The method of FIG. 4 comprises receiving analog data by at least one reception antenna (410), converting the analog data to digital data (420), storing the digital data in first and second buffer memories (430), and outputting the stored digital data out of the first and second buffer memories in an alternating manner (440).

According to an example of the method of the forth aspect, the method further comprises connecting the first buffer memory to an analog-to-digital converter and connecting the second buffer memory to an output interface during a first period, and connecting the second buffer memory to the analog-to-digital converter and connecting the first buffer memory to the output interface during a second period. According to a further example thereof, the method further comprises changing from the first period to the second period when a storing operation of storing data in the first buffer memory has been completed, and changing from the second period to the first period when a storing operation of storing data in the second buffer memory has been completed.

Further examples of the method of the forth aspect can be formed by adding any one of the examples or features described above in connection with an electronic device for gesture recognition of the first aspect, a radar sensor system of the second aspect, or an electronic device of the third aspect.

Figure 5:
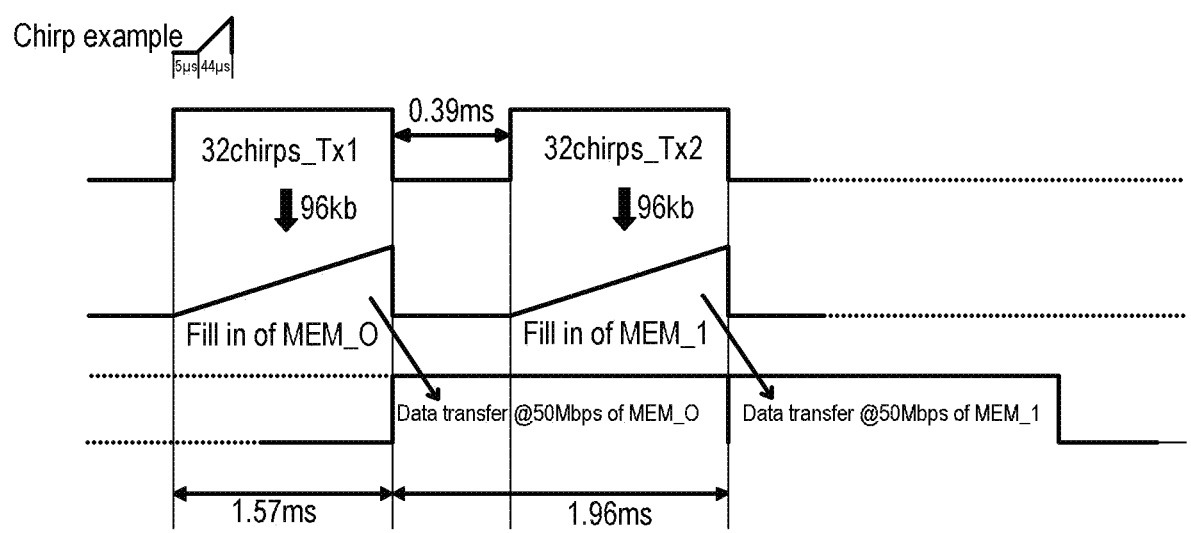
FIG. 5 shows a timing diagram depicting transmitting two transmission channels (upper curve), filling memories (middle curve), and data transfer (lower curve) according to an example.

FIG. 5 shows a timing diagram that illustrates the processing of data according to an example. The timing diagram includes traces that represent the transmission of signals of two transmission antennas (upper curve), the filling of the first and second buffer memories (middle curve), and data transfer from the first and second buffer memories (lower curve).

As explained in the introductory portion of the present application, the transmitted signal is frequency-modulated by a periodic saw-wave function (also referred to as a "chirp"). In the example of FIG. 5, two transmission antennas transmit alternately, wherein each transmission period includes 32 chirps, an example of which is shown above the upper curve. Accordingly, supposing each chirp is done, for example, in 44 μs and that there is a 5 μs delay from chirp to chirp, then a frame lasts for a period of 1.568 ms. The difference between 1.568 ms and 1.96 ms sets the duty cycle in the system as shown in FIG. 5. The system could run up to a maximum duty cycle of 80%. It should be noted that in case in the case of systems employing beam forming using both transmission channels, the system could run a first frame of 32 chirps on the first antenna, start data transfer, and in-between start a second frame on the second antenna. After the data transmission of the second antenna is done, the system could operate in a slow power mode if a duty cycle of much less than 80% is used.

In the following, an overall generated data rate is estimated followed by an estimation of the size of the first and second buffer memories. Under the assumption that the radar sensor system is an FMCW radar sensor system having 4 reception channels, and that in each frame X chirps are performed, the modulation ramp speed is 7 GHz in 44 μs, the most far target that should be detected is at a distance of 1 m, and that the ADC is capable of 2.5 MSps with a resolution of 12 bits. Then, in the worst case, we can assume:

4 [channels]×2.5 [MSps]×12 [bits]→120 [Mbps]

and in the best case:

4 [channels]×1.45 [MSps]×12 [bits]→70 [Mbps] (in case 64 samples for each ramp are sufficient and each ramp is done in 44 μs).

A data rate of 70 Mbps is, however, still too high to be handled by standard SPI consisting on one single MISO line. Supposing that the maximum clock of the SPI is 50 MHz, then a specific duty cycle in the system and an on-chip memory (e.g. SRAM) in the front-end chip should be considered in order to transfer the data. Hence a double buffer memory, as described above, could be used to successfully handle the data transfer. Its size should be large enough to store the data of several chirps in a frame and the duty cycle in the system will run between two frames.

Concerning the size of the first and second buffer memories, it is supposed that the system is based on a transceiver comprising 2 transmission channels and 4 reception channels, the system requires A number of chirps in a frame, each reception channel is sampled with a B bits ADC, and the resolution for the FFT requires minimum C number of samples. Then the overall minimum size of each memory block to store the data of a frame consisting of A chirps should be: 4×A×B×C. As a way of example, supposing A=32, B=12, and C=64, then the size of each of the first and second buffer memories is 98.304 bits. Concerning the duty cycle, it is supposed that we have to transfer 98.304 bits, and it is supposed that the maximum data rate on the SPI channel (MISO) is 50 Mbps, then 1.96 ms are required.

While the disclosure has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

What is claimed is:

1. A radar device, comprising
   a transmission antenna port;
   a reception antenna port;
   a mixer connected to the reception antenna port, the mixer being configured to down convert an analog received signal to an analog intermediate frequency signal, the analog received signal received from a moving object;
   an analog-to-digital converter connected to the mixer, the analog-to-digital converter configured to convert the analog intermediate frequency signal to a digital intermediate frequency signal data;
   first and second buffer memories connected to the analog-to-digital converter, wherein:
     the radar device is configured to adopt a first state and a second state in an alternating manner,
     in the first state, the radar device is configured to transmit a first plurality of chirps via the transmission antenna port,
     in the second state, the radar device is configured to transmit a second plurality of chirps via the transmission antenna port subsequent to the first plurality of chirps,
     in the first state the first buffer memory is configured to store the digital intermediate frequency signal data received from the analog-to-digital converter, and the second buffer memory is configured to output digital intermediate signal data stored in the second buffer memory, and
     in the second state the second buffer memory is configured to store the digital intermediate frequency signal data received from the analog-to-digital converter, and the first buffer memory is configured to output the digital intermediate frequency signal data stored in the first buffer memory; and
   a finite state machine configured to adopt the first and second states in the alternating manner, wherein each one of the first buffer memory and the second buffer memory comprises an output connected to an input of the finite state machine, and each one of the first buffer memory and the second buffer memory is configured to supply a signal to the finite state machine indicating that storing the digital intermediate frequency signal data has been completed.

2. The radar device according to claim 1, wherein
   in the first state the finite state machine is configured to enable the first buffer memory to store the digital intermediate frequency signal data, memory, and in the second state the finite state machine is configured to enable the second buffer memory to store the digital intermediate frequency signal data; and
   in the first state the finite state machine is configured to enable the second buffer memory to output the digital intermediate frequency signal data received from the analog-to-digital converter, and in the second state the finite state machine is configured to enable the first buffer memory to store the digital intermediate frequency signal data received from the analog-to-digital converter.

3. The radar device according to claim 1, further comprising:
   a first switch comprising a first input, a first output, and a second output, wherein
     the first input is connected to an output of the analog-to-digital converter, the first output is connected to an input of the first buffer memory, and the second output is connected to an input of the second buffer memory,
     the first switch is configured to transmit the digital intermediate frequency signal data received from the analog-to-digital converter to the first and second buffer memories in the alternating manner, and
   the first switch comprises a second input connected to an output of the finite state machine.

4. The radar device according to claim 1, further comprising:
   a first switch comprising a first input, a first output, and a second output, wherein
     the first input is connected to an output of the analog-to-digital converter, the first output is connected to an input of the first buffer memory, and the second output is connected to an input of the second buffer memory, and
     the first switch is configured to transmit the digital intermediate frequency signal data received from the analog-to-digital converter to the first and second buffer memories in the alternating manner; and
   a second switch comprising a first input, a second input, and an output, wherein
     the first input is connected to an output of the first buffer memory, and the second input is connected to an output of the second buffer memory,
     the second switch is configured to transmit digital intermediate frequency signal data received from the first and second buffer memories to the output in the alternating manner, and
     the second switch comprises a third input connected to an output of the finite state machine.

5. The radar device according to claim 1, further comprising:
   a first switch comprising a first input, a first output, and a second output, wherein
     the first input is connected to an output of the analog-to-digital converter, the first output is connected to an input of the first buffer memory, and the second output is connected to an input of the second buffer memory, and wherein
     the first switch is configured to transmit the digital intermediate frequency signal data received from the analog-to-digital converter to the first and second buffer memories in the alternating manner.

6. The radar device according to claim 5, further comprising:
   a second switch comprising a first input, a second input, and an output; wherein the first input is connected to an output of the first buffer memory, and the second input is connected to an output of the second buffer memory; and wherein the second switch is configured to transmit digital intermediate frequency signal data received from the first and second buffer memories to the output in alternating manner.

7. The radar device according claim 1, further comprising: an output interface comprising a serial peripheral interface (SPI) module connected to the first and second buffer memories.

8. A method for radar sensing, the method comprising:
adopting a first state and a second state in an alternating manner using a finite state machine;
transmitting a first plurality of chirps via a transmission antenna port in the first state;
transmitting a second plurality of chirps subsequent to the first plurality of chirps via the transmission antenna port in the second state;
receiving an analog signal from a reception transmission port, the analog signal comprising a reflected portion of the first plurality of chirps and the second plurality of chirps;
down converting the analog signal to an intermediate frequency analog signal;
converting the intermediate frequency analog signal to an intermediate frequency digital signal;
in the first state, storing intermediate frequency digital signal data of the intermediate frequency digital signal in a first buffer memory, and outputting digital intermediate signal data stored in a second buffer memory from the second buffer memory; and
in the second state, storing the intermediate frequency digital signal data of the intermediate frequency digital signal in the second buffer memory, and outputting the digital intermediate frequency signal data stored in the first buffer memory from the first buffer memory; and
the first and second buffer memories supplying a signal to the finite state machine indicating that storing the digital intermediate frequency signal data has been completed, wherein each one of the first buffer memory and the second buffer memory comprises an output connected to an input of the finite state machine.

9. The method according to claim 8, further comprising:
during the first state connecting the first buffer memory to an analog-to-digital converter and connecting the second buffer memory to an output interface; and
during the second state connecting the second buffer memory to the analog-to-digital converter and connecting the first buffer memory to the output interface.

10. The method according to claim 8, further comprising:
changing from the first state to the second state when a storing operation of storing intermediate frequency digital signal data in the first buffer memory has been completed; and
changing from the second state to the first state when a storing operation of storing intermediate frequency digital signal data in the second buffer memory has been completed.

11. A product, comprising
a radar sensing device, comprising
a transmission antenna port;
a reception antenna port;
a mixer connected to the reception antenna port, the mixer being configured to down convert an analog received signal to an analog intermediate frequency signal, the analog received signal originating from a moving object;
an analog-to-digital converter connected to the mixer, the analog-to-digital converter configured to convert the analog intermediate frequency signal to digital intermediate frequency signal data;
first and second buffer memories connected to the analog-to-digital converter;
a finite state machine configured to adopt first and second states in an alternating manner;
a first switch comprising a first input, a first output, and a second output, wherein
the first input is connected to an output of the analog-to-digital converter, the first output is connected to an input of the first buffer memory, and the second output is connected to an input of the second buffer memory, and
the first switch is configured to transmit the digital intermediate frequency signal data received from the analog-to-digital converter to the first and second buffer memories in the alternating manner; and
a second switch comprising a first input, a second input, and an output, wherein
the first input is connected to an output of the first buffer memory, and the second input is connected to an output of the second buffer memory,
the second switch is configured to transmit digital intermediate frequency signal data received from the first and second buffer memories to the output in the alternating manner, and
the second switch comprises a third input connected to an output of the finite state machine, wherein:
when the radar sensing device transmits a first plurality of chirps from the transmission antenna port in the first state, the first buffer memory is configured to store the digital intermediate frequency signal data received from the analog-to-digital converter in the first state, and the second buffer memory is configured to output digital intermediate frequency data stored in the second buffer memory, and
when the radar sensing device transmits a second plurality of chirps from the transmission antenna port subsequent to the first plurality of chirps in the second state, the second buffer memory is configured to store the digital intermediate frequency signal data received from the analog-to-digital converter, and the first buffer memory is configured to output the digital intermediate frequency signal data stored in the first buffer memory.

12. A radar device, comprising:
a transmission antenna port;
a reception antenna port;
a mixer connected to the reception antenna port, the mixer being configured to down convert an analog received signal to an analog intermediate frequency signal, the analog received signal received from a moving object;
an analog-to-digital converter connected to the mixer, the analog-to-digital converter configured to convert the analog intermediate frequency signal to a digital intermediate frequency signal data;
first and second buffer memories connected to the analog-to-digital converter, wherein:
the radar device is configured to adopt a first state and a second state in an alternating manner, in the first state, the radar device is configured to transmit a first plurality of chirps via the transmission antenna port, in the second state, the radar device is configured to transmit a second plurality of chirps via the transmission antenna port subsequent to the first plurality of chirps, in the first state the first buffer memory is configured to store the digital intermediate frequency signal data received from the analog-to-digital converter, and the second buffer memory is configured to output digital intermediate signal data stored in the second buffer memory, and in the second state the second buffer memory is configured to store the digital intermediate frequency signal data received from the analog-to-digital converter, and the first buffer memory is configured to output the digital intermediate frequency signal data stored in the first buffer memory;

a finite state machine configured to adopt the first and second states in the alternating manner;

a first switch comprising a first input, a first output, and a second output, wherein the first input is connected to an output of the analog-to-digital converter, the first output is connected to an input of the first buffer memory, and the second output is connected to an input of the second buffer memory, and the first switch is configured to transmit the digital intermediate frequency signal data received from the analog-to-digital converter to the first and second buffer memories in the alternating manner; and a second switch comprising a first input, a second input, and an output, wherein the first input is connected to an output of the first buffer memory, and the second input is connected to an output of the second buffer memory, the second switch is configured to transmit digital intermediate frequency signal data received from the first and second buffer memories to the output in the alternating manner, and the second switch comprises a third input connected to an output of the finite state machine.

* * * * *